US012691637B2

(12) United States Patent
Talken et al.

(10) Patent No.: US 12,691,637 B2
(45) Date of Patent: Jul. 28, 2026

(54) ADDITIVE MANUFACTURING METHOD TO ACHIEVE THREE DIMENSIONAL PARTS HAVING SUPERIOR PROPERTIES

(71) Applicant: Henkel AG & Co. KGaA, Duesseldorf (DE)

(72) Inventors: Nick Talken, Concord, CA (US); Stefan Hinote, Vacaville, CA (US)

(73) Assignee: Henkel AG & Co. KGaA, Duesseldorf (DE)

( * ) Notice: Subject to any disclaimer, the term of this patent is extended or adjusted under 35 U.S.C. 154(b) by 276 days.

(21) Appl. No.: 17/722,640

(22) Filed: Apr. 18, 2022

(65) Prior Publication Data

US 2022/0234292 A1 Jul. 28, 2022

Related U.S. Application Data

(63) Continuation of application No. PCT/US2020/056250, filed on Oct. 19, 2020.

(60) Provisional application No. 62/916,268, filed on Oct. 17, 2019.

(51) Int. Cl.
| | |
|---|---|
| *B29C 64/314* | (2017.01) |
| *B29C 64/124* | (2017.01) |
| *B33Y 10/00* | (2015.01) |
| *B33Y 40/10* | (2020.01) |
| *B33Y 70/00* | (2020.01) |

(52) U.S. Cl.
CPC .......... *B29C 64/314* (2017.08); *B29C 64/124* (2017.08); *B33Y 10/00* (2014.12); *B33Y 40/10* (2020.01); *B33Y 70/00* (2014.12); *B29K 2995/0088* (2013.01)

(58) Field of Classification Search
CPC ......... B33Y 40/10; B33Y 70/00; B33Y 30/00; B33Y 10/00; B29C 64/329; B29C 64/314; B29C 64/112; B29C 64/124; B29C 64/118; B29K 2995/0088
See application file for complete search history.

(56) References Cited

U.S. PATENT DOCUMENTS

| | | | |
|---|---|---|---|
| 10,625,497 B2 | 4/2020 | Chen et al. | |
| 2003/0083771 A1 | 5/2003 | Schmidt | |
| 2003/0092820 A1 | 5/2003 | Schmidt et al. | |
| 2009/0130449 A1 | 5/2009 | El-Siblani | |
| 2015/0130100 A1* | 5/2015 | Fiegener | B29C 64/118 |
| | | | 425/150 |
| 2017/0113406 A1 | 4/2017 | Chen et al. | |
| 2019/0168449 A1* | 6/2019 | Talken | B29C 64/124 |
| 2019/0314891 A1 | 10/2019 | Liang | |

FOREIGN PATENT DOCUMENTS

| | | |
|---|---|---|
| CN | 107414076 A | 12/2017 |
| JP | 2005504654 A | 2/2005 |
| JP | 2005504860 A | 2/2005 |
| WO | 2015164234 A1 | 10/2015 |
| WO | 2019005022 A1 | 1/2019 |
| WO | 2019186070 A1 | 10/2019 |

OTHER PUBLICATIONS

PCT International Search Report in connection with International Patent Application No. PCT/US2020/056250 Mailing date: Feb. 17, 2021.

* cited by examiner

*Primary Examiner* — Monica A Huson
(74) *Attorney, Agent, or Firm* — Steven C. Bauman

(57) ABSTRACT

Additive manufacturing methods to achieve three dimensional parts having superior properties are provided herein.

56 Claims, No Drawings

ADDITIVE MANUFACTURING METHOD TO ACHIEVE THREE DIMENSIONAL PARTS HAVING SUPERIOR PROPERTIES

BACKGROUND

Field

The present disclosure relates to additive manufacturing method to achieve three dimensional parts having superior properties.

Brief Description of Related Technology

Single reaction mechanism, energy polymerizable resins, when hardened, generally have poor mechanical properties when compared to traditional thermoplastics. The toughness of many engineering thermoplastic materials, which includes impact strength, elongation and tensile strength, are much higher than single reaction mechanism, energy polymerized materials. Additionally, traditional energy polymerizable resins show even lower toughness when they are formulated to achieve higher heat deflection temperatures (HDT).

Attempts to improve mechanical property performance of single reaction mechanism, energy polymerized materials is to use high molecular weight, multifunctional, energy polymerizable oligomers. These oligomers when polymerized provide lower crosslink density, though the overall chain molecular weight is higher. However, with the high molecular weight oligomers comes high viscosity, which limits their ability to be used in viscosity restrictive applications, such as inkjet printing, stereolithography (SLA), digital light processing (DLP) or three dimensional printing (3DP).

In conventional additive manufacturing techniques, construction of a three-dimensional part is performed in a step-wise or layer-by-layer manner. In particular, layer formation is generally performed through solidification of photocurable resin under exposure to visible or UV light irradiation.

If new layers are formed at the top surface of the growing part, then after each irradiation step the part under construction is lowered into the resin "pool," a new layer of resin is coated on top, and a new irradiation step takes place. A disadvantage of such "top down" techniques is the need to submerge the growing object in a (potentially deep) pool of liquid resin and reconstitute a precise overlayer of liquid resin.

If new layers are formed at the bottom of the growing object, then after each irradiation step the object under construction is moved away from the bottom plate in the fabrication well. While such "bottom up" techniques hold the potential to eliminate the need for a deep well in which the object is submerged by instead lifting the object out of a relatively shallow well or pool. A constraint with both of these additive techniques is also viscosity, as the fluid with a viscosity less than 2000 cPs is generally required for consistent layers at the top or bottom interface. Additionally, the methods of the bottom up technique are preferential to a more rigid material to ensure consistent layer-layer placement and surface finish of the final part. Pot life stability is also an important consideration for all techniques, as polymerization that can occur in the absence of energy initiation can cause part defect or the entire vat to solidify. Examples of such polymerization reactions may occur with many of the dual reaction mechanism materials provided by Carbon Inc., such as CE 220, CE221, EPU 40, EPX 81, FPU 50, RPU 60, RPU 61 and RPU 70.

Single reaction mechanism, energy polymerizable resins, are described in U.S. Pat. No. 10,239,255, which provides improvements in the mechanical properties of such resins through formulation strategies. The '255 patent is directed to and claims a free radical polymerizable liquid, the free radical polymerizable liquid comprising a reactive oligomer, the reactive oligomer being at least one (i) a multi-functional methacrylate oligomer, and (ii) a multi-functional acrylate oligomer; and a reactive monofunctional monomer, the reactive monofunctional monomer being at least one of (i) a monofunctional N-vinyl monomer, (ii) a monofunctional vinyl ether monomer, (iii) a monofunctional vinyl ester monomer, (iv) a monofunctional vinylamide monomer, (v) a styrene monomer, (vi) a monofunctional acrylamide monomer, (vii) monofunctional (meth)acrylate monomer, (viii) a cyanoacrylate monomer, (ix) a monofunctional vinyl carbonate monomer, (x) a monofunctional acryloyl monomer, and (xi) a monofunctional vinyl carbamate monomer, wherein a molar bond ratio of the reactive ethylenically unsaturated groups of the reactive monofunctional species to the reactive ethylenically unsaturated groups of the reactive multi-functional species is at least 10:1, wherein a total weight % of the reactive monofunctional species in the calculation of the molar bond ratio is at least 25% of the polymerizable liquid, and wherein a total weight % of the reactive multifunctional species in the calculation of the molar bond ratio is at least 25% of the polymerizable liquid, the free radical polymerizable liquid being an energy polymerizable liquid hardenable by a single reaction mechanism forming a photoplastic material.

Nonetheless, additional improvements in physical properties (such as toughness with high heat deflection temperature) are still desired in many three dimensional parts made for instance by inkjet printing, SLA, DLP or 3DP. To date, these improvements have not yet been realized. Accordingly, the need still exists for a way in which to achieve the sought-after properties in such parts.

SUMMARY

That need is satisfied here.

In large measure, the need is satisfied through method technology involving the use of non-flowable at room temperature functionalized materials.

Provided herein is a method for performing additive manufacturing using a photocurable composition to form a three-dimensional part. Ordinarily, the additive manufacturing is performed on a build substrate. And the three-dimensional part is made according to data indicating a pre-determined pattern. The method includes the steps of:

A. Providing a photocurable composition in a non-flowable state to a reservoir, such as a hopper, container or a vessel;

B. Subjecting the photocurable composition to conditions favorable to render the photocurable composition in a flowable state; and C. Exposing the flowable photocurable composition to radiation in the electromagnetic spectrum appropriate to initiate polymerization thereof as the three-dimensional printed part is made according to data indicating a pre-determined pattern.

In one embodiment, when polymerized the photocurable composition has adjustable mechanical properties by changing subsequent energy polymerization conditions through additional exposure to radiation in the electromagnetic spectrum.

DETAILED DESCRIPTION

As noted above, provided herein is a method for performing additive manufacturing using a photocurable composition to form a three-dimensional part. Ordinarily, the additive manufacturing is performed on a build substrate. And the three-dimensional part is made according to data indicating a pre-determined pattern. The method includes the steps of:

A. Providing a photocurable composition in a non-flowable state to a reservoir;

B. Subjecting the photocurable composition to conditions favorable to render the photocurable composition in a flowable state; and C. Exposing the flowable photocurable composition to radiation in the electromagnetic spectrum appropriate to initiate polymerization thereof as the three-dimensional printed part is made according to data indicating a pre-determined pattern.

The photocurable composition comprises a solid or non-flowable at room temperature functionalized component. The solid functionalized component should have at least one, desirably at least two, functional group(s) selected from (meth)acrylates, α-olefins, N-vinyls, vinylamides, cyanoacrylates, (meth)acrylamides, acryloyls, styrenics, epoxides, thiols, 1,3-dienes, vinyl halides, acrylonitriles, vinyl esters, maleimides, nadimides, itaconimides, vinyl ethers, vinyl carbonates, and vinyl carbamates. Desirably, the functional group is a (meth)acrylate. And desirably there are at least two (meth)acrylate functional groups.

In one aspect the photocurable composition comprises a solid or non-flowable at room temperature functionalized component having a backbone selected from sulfones, styrenes, isocyanurates, cyanate esters, maleimides, nadimides, itaconimides, bicycloalkyls (e.g., adamantly, fenchyl or norbornyl), biphenyls, novolak, triazines, carbonates, amides, urethanes, ureas, polyesters and combinations thereof. The term "backbone" is intended to refer to a chemical moiety to which or between which the functional group(s) are attached.

Suitable choices of the solid or non-flowable at room temperature functionalized component include those available commercially from Dymax Corporation, Torrington, CT, such as BR-571, Sartomer Inc., Exton, PA, such as CN9788, Huntsman Corporation, such as many bismaleimides, and Evonik, such as Compimide MDAB and Compimide 200.

In some embodiments, the photocurable composition comprises from about 1, 2 or 5 percent by weight to 20, 30, 40, 90 or 99 percent by weight of the solid or non-flowable at room temperature functionalized material. Desirably, the solid functionalized component should be used in an amount of about 90 to about 99 percent by weight, based on the photocurable composition.

The photocurable composition comprises a solid or non-flowable at room temperature functionalized component that should have a molecular weight of greater than about 400 Mn, desirably a molecular weight of greater than about 800 Mn, and more desirably a molecular weight of greater than about 1200 Mn, each measured in daltons.

The photocurable composition comprises a solid or non-flowable at room temperature functionalized component that in one aspect comprises a crystalline structure at or above a temperature of about 25° C. (which ordinarily would be considered room temperature).

Suitable choices of the solid or non-flowable at room temperature functionalized component in crystalline structures include sulfones, styrenes, isocyanurates, cyanate esters, maleimides, nadimides, itaconamides, bicycloalkyls (e.g., adamantyl, fenchyl or norbornyl), biphenyls, novolak, triazines, carbonates, amides, urethanes, ureas, polyesters and combinations thereof.

The photocurable composition comprises a solid or non-flowable at room temperature functionalized component that in another aspect demonstrates a phase change from solid to liquid within a 1° C. to 10° C., such as 5° C., increase in temperature measured by DSC over a period of time of 20 minutes.

The photocurable composition should in many instances also comprise a photoinitiator. Appropriate photoinitiators include triazines, ketones, peroxides, diketones, azides, azo derivatives, disulfide derivatives, disilane derivatives, thiol derivatives, diselenide derivatives, diphenylditelluride derivatives, digermane derivatives, distannane derivatives, carbo-germanium compounds, carbon-silicon derivatives, sulfur-carbon derivatives, sulfur-silicon derivatives, peresters, Barton's ester derivatives, hydroxamic and thiohydroxamic acids and esters, organoborates, organometallic compounds, titanocenes, chromium complexes, aluminate complexes, carbon-sulfur or sulfur-sulfur iniferter compounds, oxyamines, aldehydes, acetals, silanes, phosphorous-containing compounds, borane complexes, thioxanthone derivatives, coumarins, anthraquinones, fluorenones, and ferrocenium salts. Particularly desirable photoinitiators includebenzophenone, anthraquinone, and fluoroenone.

When used, the photoinitiator should be present in an amount of from about 0.01 percent to about 15 percent by weight.

The photocurable composition may contain but does not require a thermal initiator.

In step B of the inventive method, the photocurable composition should be exposed to a temperature of between about 45° C. to about 160° C., desirably between about 60° C. to about 120° C.

In step B of the inventive method, the photocurable composition should have a vapor pressure less than about 1 mm Hg, desirably less than about 0.1 mm Hg, and more desirably less than about 0.01 mm Hg.

And in step C of the inventive method, the photocurable composition should have a vapor pressure less than about 1 mm Hg, desirably less than about 0.1 mm Hg, and more desirably less than about 0.01 mm Hg.

In step B of the inventive method, the photocurable composition is maintained in a reservoir, which is heated to a temperature of about 45° C. to about 160° C., desirably about 60° C. to about 120° C.

And in step C of the inventive method, the photocurable composition is maintained in a reservoir, which is heated to a temperature of about 45° C. to about 160° C., desirably about 60° C. to about 120° C. composition.

In step C of the inventive method, the photocurable composition should be maintained at a temperature that allows the photocurable composition to be flowable. That temperature may be about 30° C. to about 120° C. greater than room temperature, at which temperature dispensing or printing may occur. Room temperature is ordinarily regarded as about 25° C.

In step C of the inventive method, the photocurable composition is exposed to radiation in the electromagnetic spectrum in a range of 355 nm to 405 nm. That radiation may be emitted from a LED source, which may be chosen from a laser, a plurality of lasers, a projector or a plurality of projectors. The LED source may be applied from beneath or from above a reservoir in which is contained the photocurable composition.

Single reaction mechanism energy polymerization involves the use of energy to initiate and drive the polymerization through one reaction mechanism. Irradiation through exposure to actinic radiation, UV light and Visible light. Such examples include UV light (100 nm-405 nm), Visible Light (405 nm-700 nm) or Electron beam. Examples of suitable light sources include LEDs, laser diodes, laser beams, lamps (halogen lamp, Xe, Xe—Hg lamps, etc.), LED Lasers or LED projectors used in additive manufacturing, Visible light irradiating LCD, LED or Plasma screens, mobile or tablet devices. This polymerization then is carried out through a single reaction mechanism, such as free radical, cationic, Michael addition, step-growth, click-chemistry, to name a few.

A photoplastic material is formed through a single reaction mechanism of the photocurable composition after conducting the inventive method. Compared to existing photopolymers, photoplastics have mechanical properties that are comparable to thermoplastics.

Like U.S. Pat. No. 10,239,255 (Talken), polymerization of the photocurable composition occurs through a single reaction mechanism. See the '255 patent for a further discussion.

In step C of the inventive method, in addition to exposure to radiation in the electromagnetic spectrum, the photocurable composition may be exposed to a temperature condition greater than the elevated temperature conditions used in step B to render the photocurable composition flowable.

The three-dimensional part formed in step C of the inventive method may have a heat deflection temperature (@0.455 MPa) at least as high as the elevated temperature of step B or of step C.

The three-dimensional part formed in step C of the inventive method should achieve at least about 50% of at least one of its ultimate strength, its ultimate stiffness and its ultimate heat deflection temperature.

In some embodiments, the inventive method employs the photocurable composition as chips, pellets, powder, wire, spooled or some other granule solid form factor.

In some embodiments, the photocurable composition is exposed to an elevated temperature of between about 45° C. to about 160° C. in a hopper system to render it into a flowable state.

In some embodiments, the photocurable composition is exposed to an elevated temperature in a continuous manner, through a nozzle, heated core, hot end, heated extruder or similar device.

In some embodiments, the photocurable composition is provided in a physical form factor with a high surface area to volume ratio such as 0.5:1 so as to enable rapid heat transfer during step B.

In some embodiments, the inventive method adds a step D, which involves contacting the three-dimensional part with a solvent or a wash liquid. The solvent or wash liquid may be chosen from lower alkyl alcohols, such as isopropanol, or mild surfactants.

The solvent or wash liquid may be heated to an elevated temperature in use here. In this manner, un-reacted material on the surface of the part may be rendered flowable, so as to more easily remove the un-reacted material via solvation or mechanical agitation, such as sonication.

In some embodiments, the inventive method adds a step E, which involves exposing the three-dimensional part formed in step C to an elevated temperature condition. The elevated temperature condition here may be at least 160° C. Step E may follow either or both of step(s) C and D.

In step E of the inventive method, the elevated temperature condition is a temperature condition greater than the elevated temperature condition to which the photocurable composition is exposed in step C. The elevated temperature condition should be achieved by ramping at a pre-determined rate from the temperature condition of step C to at least one higher temperature condition. That greater temperature condition should be about 45° C. to about 160° C. greater than step C.

In some embodiments, the inventive method adds a step F, which involves exposing the three-dimensional part formed in step C to radiation in the electromagnetic spectrum of a wavelength different from the radiation in the electromagnetic spectrum used in step C. The radiation in step F may be emitted from a light source selected from an LED light source, which may be chosen from a laser, a plurality of lasers, a projector or a plurality of projectors, or a broad-band light source. The radiation in step F may be a second form of radiation in the electromagnetic spectrum, such as gamma irradiation, electron beam or microwave irradiation.

After step E of the inventive method, the three-dimensional part formed should achieve about 100% of at least one of its ultimate strength, its ultimate stiffness and its ultimate heat deflection temperature.

Indeed, in some embodiments, the three-dimensional part formed after step E demonstrates substantially homogeneous strength, stiffness and heat deflection temperature throughout its volume, regardless of size, geometry, internal complexity or surfaces, irrespective of where the measurement is taken on the part.

The three-dimensional part formed after step E may demonstrate a tensile elongation>=yield strength of the three-dimensional part, a tensile elongation of at least about 6%, desirably at least about 10%, and a heat deflection temperature (@ 0.455 MPa) of greater than 100° C., desirably greater than 120° C. and more desirably greater than 160° C.

The photocurable composition may reach prescribed physical or mechanical properties with or without exposure to elevated temperature conditions. Such thermal exposure may be achieved by active heating (e.g., in an oven, such as an electric, gas, or solar oven), or passive heating (e.g., at ambient temperature). Active heating will generally be more rapid than passive heating and in some embodiments is preferred, but passive heating—such as simply maintaining the intermediate at ambient temperature for a sufficient time to effect further polymerization—is in some embodiments preferred.

The inventive methods permit the formation of a three-dimensional part having dimensional stability after conducting some or all of the post processing steps (i.e., steps D, E, and/or F.). This means having 90% of the final part structure within a certain tolerance or error when compared to the original design/CAD model or compared to the part after step C, such as less than about 500 µm, such as 200 µm, desirably 100 µm dimensional inaccuracy.

Any suitable filler may be used in connection with the various embodiments described herein, depending on the properties desired in the part or object to be made. Thus, fillers may be solid or liquid, organic or inorganic, and may be reactive and non-reactive rubbers, examples of all of which include siloxanes, organic phosphinates, acrylonitrile-butadiene rubbers; reactive and non-reactive thermoplastics (such as poly(ether imides), maleimide-styrene terpolymers, polyarylates, polysulfones and polyethersulfones) inorganic fillers such as silicates (such as talc, clays, silica, or mica), glass, carbon nanotubes, graphene, carbon-fiber, metals and cellulose nanocrystals and combinations thereof.

One or more polymeric and/or inorganic tougheners may be included in the photocurable composition. The toughener may be substantially uniformly distributed in the form of particles in the polymerized product. The particles can be less than 5 μm in diameter. Such tougheners include those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, and fullerenes), ceramics and silicon carbides, with or without surface modification or functionalization. Examples of block copolymers include the copolymers described, for example in U.S. Pat. No. 6,894,113, the entire contents of which are incorporated herein by reference and include NANOSTRENGTH SBM (polystyrene-polybutadiene-polymethacrylate), and AMA (polymethacrylate-polybutylacrylate-polymethacrylate), both produced by Arkema. Other suitable block copolymers include FORTEGRA and the amphiphilic block copolymers described in U.S. Pat. No. 7,820,760, the entire contents of which are incorporated herein by reference. Examples of known core-shell particles include the core-shell (dendrimer) particles whose compositions are described in U.S. Patent Application Publication No. 2010/0280151. For an amine branched polymer as a shell grafted to a core polymer polymerized from polymerizable monomers containing unsaturated carbon-carbon bonds, core-shell rubber particles described, for example, in EP 1632533A1 and EP 2123711A1, the entire contents of which are incorporated herein by reference, and the Kane Ace MX product line of such particle/epoxy blends with particles that have a polymeric core polymerized from polymerizable monomers such as butadiene, styrene, other unsaturated carbon-carbon bond monomer, or their combinations, and a polymeric shell compatible with the epoxy, typically polymethylmethacrylate, polyglycidylmethacrylate, polyacrylonitrile or similar polymers, as discussed further below. Also suitable as block copolymers in the present invention are the JSR SX series of carboxylated polystyrene/polydivinylbenzenes produced by JSR Corporation; KUREHA PARALOID EXL-2655 (produced by Kureha Chemical Industry Co., Ltd.), which is a butadiene alkyl methacrylate styrene copolymer; STA-FILOID AC-3355 and TR-2122 (both produced by Takeda Chemical Industries, Ltd.), each of which are acrylate methacrylate copolymers; and PARALOID EXL-2611 and EXL-3387 (both produced by Dow Chemical), each of which are butyl acrylate methyl methacrylate copolymers. Examples of suitable oxide particles include NANOPDX produced by Nanoresins AG. This is a master blend of functionalized nanosilica particles and an epoxy.

Core-shell rubbers are particulate materials (particles) having a rubbery core. Such materials are known and described in, for example, U.S. Patent Application Publication Nos. 2015/0184039 and 2015/0240113; and U.S. Pat. Nos. 6,861,475; 7,625,977; 7,642,316; and 8,088,245, the entire contents of all of which are incorporated herein by reference, and elsewhere.

In some embodiments, the core-shell rubber particles are nanoparticles [i.e., having an average particle size of less than 1000 nanometers (nm)]. Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle.

In some embodiments, the rubbery core can have a Tg of less than −25° C., more preferably less than −50° C., and even more preferably less than −70° C. The Tg of the rubbery core may be well below −100° C. The core-shell rubber also has at least one shell portion that preferably has a Tg of at least 50° C. By "core," it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material can be grafted onto the core or is cross-linked. The rubbery core may constitute from 50 to 95 percent by weight, such as from 60 to 90 percent by weight, of the total amount of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20 percent by weight of other copolymerized mono-unsaturated monomers such as styrene, vinyl acetate, vinyl chloride, methyl methacrylate, and the like. The core polymer is optionally cross-linked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name GENIOPERL.

The shell polymer, which is optionally chemically grafted or cross-linked to the rubber core, can be polymerized from at least one lower alkyl methacrylate such as methyl methacrylate, ethyl methacrylate or t-butyl methacrylate. Homopolymers of such methacrylate monomers can be used. Further, up to 40 percent by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer can be between 20,000 and 500,000.

One suitable type of core-shell rubber has reactive groups in the shell polymer which can react with an epoxy resin or an epoxy resin hardener. Glycidyl groups are suitable. These can be provided by monomers such as glycidyl methacrylate.

One example of a suitable core-shell rubber is of the type described in U.S. Patent Application Publication No. 2007/0027233, the entire contents of which are incorporated herein by reference. Core-shell rubber particles as described therein include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in the document. Suitable core-shell rubbers include, but are not limited to, those sold by Kaneka Corporation under the designation Kane Ace, including the Kane Ace 15 and 120 series of products, including Kane Ace MX 120, Kane Ace MX 153, Kane Ace MX 154, Kane Ace MX 156, Kane Ace MX170, and Kane Ace MX 257 and Kane Ace MX 120 core-shell rubber dispersions, and combinations thereof.

Suitable resins for the photocurable composition include photocurable silicones. UV polymerizable silicone rubber, such as SILIOPREN UV Polymerizable Silicone Rubber and LOCTITE Polymerizable Silicone adhesive sealants. Applications include optical instruments, medical and surgical equipment, exterior lighting and enclosures, electrical connectors/sensors, fiber optics, gaskets, and molds.

Biodegradable resins for the photocurable composition are particularly important for implantable devices to deliver drugs or for temporary performance applications, like biodegradable screws and stents (U.S. Pat. Nos. 7,919,162 and 6,932,930, the entire contents of which are incorporated herein by reference). Biodegradable copolymers of lactic acid and glycolic acid (PLGA) can be dissolved in PEG di(meth)acrylate to yield a transparent resin suitable for use, Polycaprolactone and PLGA oligomers can be functionalized with acrylic or methacrylic groups to allow them to be effective resins for use.

Another suitable resin for the photocurable composition includes photocurable polyurethanes (including polyureas, and copolymers of polyurethanes and polyureas [e.g., poly (urethane-urea)]. A photocurable polyurethane/polyurea composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337, 130, the entire contents of which are incorporated herein by reference). Photocurable thermoplastic polyurethane elastomers may incorporate photoreactive diacetylene diols as chain extenders.

The photocurable composition can have additional ingredients solubilized or dispersed therein, including pigments, dyes, detectable compounds (e.g., fluorescent, phosphorescent, and radioactive), fillers, light absorbers, or inhibitors of polymerization, again depending upon the particular purpose of the product being fabricated.

In some embodiments, an organic peroxide may be included in the single reaction mechanism energy polymerizable liquid or resin, for example to facilitate the reaction of potentially unreacted double bonds during heat and/or microwave irradiation. Such organic peroxides may be included in the resin or polymerizable liquid in any suitable amount, such as from 0.001 or 0.01 or 0.1 percent by weight, up to 1, 2, or 3 percent by weight. Examples of suitable organic peroxides include, but are not limited to, 2,5-bis (tert-butylperoxy)-2,5-dimethylhexane (e.g., LUPEROX 101), dilauroyl peroxide (e.g., LUPEROX LP), benzoyl peroxide (e.g., LUPEROX A98), and bis(tert-butyldioxyisopropyl)benzene (e.g., VulCUP R). Such organic peroxides are commercially available from a variety of sources, including but not limited to Arkema Inc.

It will be clear to those skilled in the art that the method of the invention will be useful in a wide range of additive manufacturing techniques including Jet Fusion, and Ink jet methods.

The photocurable composition may be used in bottom-up additive manufacturing techniques such as the continuous liquid interface printing techniques described for instance in the '255 patent, or other additive manufacturing techniques, as noted herein.

Three-dimensional printed parts produced by the methods and processes of the present invention may be final, finished or substantially finished products, or may be intermediate products subject to further manufacturing steps such as surface treatment, laser cutting, or electric discharge machining, is intended. Intermediate products include products for which further additive manufacturing, in the same or a different apparatus, may be carried out). For example, a fault or cleavage line may be introduced deliberately into an ongoing "build" by disrupting, and then reinstating, the gradient of polymerization zone, to terminate one region of the finished product, or simply because a particular region of the finished product or "build" is less fragile than others.

Numerous different products can be made by the methods and apparatus of the present invention, including both large-scale models or prototypes, small custom products, miniature or microminiature products or devices. Examples include medical devices and implantable medical devices such as hearing aids, stents, drug delivery depots, functional structures, microneedle arrays, fibers and rods, such as waveguides, micromechanical devices, and microfluidic devices.

In some embodiments, the product has at least one, or a plurality of, pores or channels formed therein, as discussed further below.

The processes described herein can produce products with a variety of different properties. Hence in some embodiments the products are rigid; in other embodiments, the products are flexible or resilient. In some embodiments, the products are a solid; in other embodiments, the products are a gel such as a hydrogel. In some embodiments, the products have a shape memory (that is, return substantially to a previous shape after being deformed, so long as they are not deformed to the point of structural failure). In some embodiments, the products are unitary (that is, formed of a single, single reaction mechanism energy polymerizable liquid); in some embodiments, the products are composites (that is, formed of two or more different single reaction mechanism energy polymerizable liquids). Particular properties will be determined by factors such as the choice of single reaction mechanism energy polymerizable liquid(s) employed.

In some embodiments, the product or article made has at least one overhanging feature (or "overhang"), such as a bridging element between two supporting bodies, or a cantilevered element projecting from one substantially vertical support body. Because of the unidirectional, continuous nature of some embodiments of the present processes, the problem of fault or cleavage lines that form between layers when each layer is polymerized to substantial completion and a substantial time interval occurs before the next pattern is exposed, is substantially reduced. Hence, in some embodiments the methods are particularly advantageous in reducing, or eliminating, the number of support structures for such overhangs that are fabricated concurrently with the article.

In some embodiments, the inventive method for performing additive manufacturing using a photocurable composition to form a three-dimensional part having improved physical properties, where the three-dimensional printed part is made according to data indicating a pre-determined pattern, comprises the steps of: Providing a photocurable composition in a non-flowable state to a reservoir; Subjecting the photocurable composition to conditions favorable to render the photocurable composition in a flowable state; Exposing the flowable photocurable composition to radiation in the electromagnetic spectrum appropriate to initiate polymerization thereof as the three-dimensional printed part is made according to data indicating a pre-determined pattern; and Exposing the three-dimensional part formed in step C to an elevated temperature condition.

The physical or structural properties of the three-dimensional part may be selected together with the properties of the photocurable composition from which the three-dimensional printed part is formed to provide a wide range of properties for the three-dimensional printed part. The inventive methods may be used to form complex shapes with desired material properties to form a wide range of three-dimensional parts.

In some embodiments, three-dimensional printed parts may be rigid and have, for example, a Young's modulus (MPa) in the range of about 800 to 4500 or any range subsumed therein, a Tensile Strength (MPa) in the range of about 30 to 250 or any range subsumed therein, a percent elongation at break in the range of about 1 to 100 or any range subsumed therein and/or a notched IZOD impact strength of about 10 to 200 J/m or any range subsumed therein. Examples of such rigid three-dimensional parts may include fasteners; electronic device housings; gears, propellers, and impellers; wheels, mechanical device housings; tools and other rigid three-dimensional printed parts.

In some embodiments, three-dimensional printed parts may be semi-rigid and have, for example, a Young's modulus (MPa) in the range of about 300-3500 or any range subsumed therein, a Tensile Strength (MPa) in the range of about 20-90 or any range subsumed therein, a percent elongation at break in the range of about 20 to 300 or 600 or any range subsumed therein, and/or a notched IZOD impact strength of about 30 to 400 J/m or any range subsumed therein. Examples of such semi-rigid three-dimensional printed parts may include structural elements; hinges including living hinges; boat and watercraft hulls and decks; wheels; bottles, jars and other containers; pipes, liquid tubes and connectors and other semi-rigid three-dimensional printed parts.

In some embodiments, three-dimensional printed parts may be elastomeric and have, for example, a Young's modulus (MPa) in the range of about 0.25-300 or any range subsumed therein, a Tensile Strength (MPa) in the range of about 0.5-30 or any range subsumed therein, a percent elongation at break in the range of about 50-1500 or any range subsumed therein, and/or a tear strength of about 10 to 200 kN/m or any range subsumed therein. Examples of such elastomeric three-dimensional printed parts may include foot-wear soles, heels, innersoles and midsoles.

Fabricating the part may be paused or interrupted one or more times, to change the photocurable composition. Three-dimensional parts made by the inventive method may include multiple photocurable compositions with the ability to achieve different tensile strengths once cured. While a fault line or plane may be formed in the intermediate by the interruption, if the photocurable composition is, in its second version, reactive with that of the first, then the two distinct segments of the intermediate will cross-react and covalently couple to one another during the second polymerization (e.g., by heating or microwave irradiation). Thus, a part may be formed by the inventive method having multiple distinct segments with different tensile properties, while still being a unitary product with the different segments covalently coupled to one another. In some embodiments, a three-dimensional part may be formed with a plurality of regions with different materials and properties. For example, a three-dimensional part could have one or more regions formed from a first material or first group of one or more materials having a Tensile Strength (MPa) in the range of about 30-100 or any range subsumed therein, and/or one or more regions formed from a second material or second group of one or more materials having a Tensile Strength (MPa) in the range of about 20-70 or any range subsumed therein and/or one or more regions formed from a third material or third group of one or more materials having a Tensile Strength (MPa) in the range of about 0.5-30 or any range subsumed therein or any combination of the foregoing. For example, the three-dimensional parts could have from 1-10 or more different regions (or any range subsumed therein) with varying tensile strength selected from any of the materials and tensile strengths described above. For example, a hinge can be formed, with the hinge comprising a rigid segment, coupled to a second elastic segment, coupled to a third rigid segment, by sequentially changing single reaction mechanism energy polymerizable liquids during the formation of the three-dimensional intermediate. A shock absorber or vibration dampener can be formed in like manner, with the second segment being either elastic or semi-rigid. A unitary rigid funnel and flexible hose assembly can be formed in like manner.

In some embodiments, adjustable mechanical properties may be achievable within the same photoplastic material (or part made therefrom) using a photocurable composition including one or more single reaction mechanism energy polymerizable resin(s). This can be accomplished by varying the energy polymerization of the photoplastic material, which changes the reaction kinetics of the system. For instance, by changing the light irradiance, light energy, light wavelength or using electron beam, it is possible to alter the polymerization reaction mechanism and polymerization reaction speeds. This is due in part to the different polymerizable functional groups that are contained in the resin, and their ability to react or not react with the same functional groups or different functional groups, which can change the final polymer molecular weight or network. This is also due in part to the same type of initiation being possible to polymerize all functional groups in the photoplastic material.

In some embodiments, the three-dimensional part formed by the inventive method satisfies a UL94 rating of V-1 or V-0. And in some embodiments, the three-dimensional part formed by the inventive method satisfies the published Airbus Standard for FST (AITM2).

Additionally, different polymer networks, molecular weights, liquid-solid, solid-solid solubility or phase separation are tunable and controllable by the process parameters stated above. Therefore, it is possible to greatly change the mechanical properties of a single resin, either pixel by pixel in a film or voxel by voxel in a part. Specifically, in additive manufacturing, VAT polymerization generally occurs with a laser, projector or screen light source. Each of these and future light sources can be controlled to emit lower wattage or lower energy on a pixel by pixel basis. Therefore, three-dimension control of voxel polymerization is possible, which can allow for objects to be created with different mechanical properties in three-dimensional space.

While the present invention is preferably carried out by Stereolithography, Material Jetting or Inkjet Printing, in some embodiments alternate methods and apparatus for bottom-up or top down three-dimension fabrication may be used, including layer-by-layer fabrication. Examples of such methods and apparatus include but are not limited to those described in U.S. Pat. Nos. 5,236,637; 5,391,072; 5,529,473; 7,438,846; 7,892,474; and 8,110,135; U.S. Patent Application Publication Nos. 2013/0292862 and 2013/029521; and PCT Application Publication No. WO 2015/164234, the entire contents of all of which are incorporated herein by reference.

What is claimed is:

1. A method for performing additive manufacturing using a photocurable composition to form a three-dimensional part, said three-dimensional part made according to data indicating a pre-determined pattern, comprising the steps of:
   A. Providing a photocurable composition in a non-flowable state to a reservoir, wherein the photocurable composition comprises a solid functionalized component;
   B. Subjecting the photocurable composition to conditions favorable to render the photocurable composition in a flowable state; and
   C. Exposing the flowable photocurable composition to radiation in the electromagnetic spectrum appropriate to initiate polymerization thereof as the three-dimensional printed part is made according to data indicating a pre-determined pattern, wherein in step B the photocurable composition is exposed to a temperature of between about 45° C. to about 160° C. and
in step C the photocurable composition is exposed to a temperature of about 45° C. to about 160° C.

2. The method of claim 1, wherein in step B the photocurable composition is exposed to a temperature of between about 60° C. to about 120° C.

3. The method of claim 1, wherein in step B the photocurable composition has a vapor pressure less than about 1 mm Hg.

4. The method of claim 1, wherein in step B the photocurable composition has a vapor pressure less than about 0.1 mm Hg.

5. The method of claim 1, wherein in step B the photocurable composition has a vapor pressure less than about 0.01 mm Hg.

6. The method of claim 1, wherein in step C the photocurable composition has a vapor pressure less than about 0.1 mm Hg.

7. The method of claim 1, wherein in step C the photocurable composition has a vapor pressure less than about 0.01 mm Hg.

8. The method of claim 1, wherein in step B the photocurable composition is maintained in a reservoir, which is heated to a temperature of about 45° C. to about 160° C.

9. The method of claim 1, wherein in step B the photocurable composition is maintained in a reservoir, which is heated to a temperature of about 60° C. to about 120° C.

10. The method of claim 1, wherein in step C the photocurable composition is exposed to a temperature of about 60° C. to about 120° C.

11. The method of claim 1, wherein in step C the photocurable composition is maintained at a temperature that allows the photocurable composition to be flowable.

12. The method of claim 1, wherein in step B the photocurable composition is dispensed at a temperature of about 30° C. to about 120° C. greater than room temperature.

13. The method of claim 1, wherein in step C the photocurable composition is printed at a temperature of about 30° C. to about 120° C. greater than room temperature.

14. The method of claim 1, wherein in step C the photocurable composition is exposed to radiation in the electromagnetic spectrum in a range of 355 nm to 405 nm.

15. The method of claim 1, wherein in step C the photocurable composition is exposed to radiation in the electromagnetic spectrum emitted from a LED source.

16. The method of claim 1, wherein in step C the photocurable composition is exposed to radiation in the electromagnetic spectrum emitted from a LED source selected from a laser, a plurality of lasers, a projector or a plurality of projectors.

17. The method of claim 1, wherein in step C the photocurable composition is exposed to radiation in the electromagnetic spectrum emitted from a LED source applied from beneath a reservoir in which is contained the photocurable composition.

18. The method of claim 1, wherein in step C the photocurable composition is exposed to radiation in the electromagnetic spectrum emitted from a LED source applied from above a reservoir in which is contained the photocurable composition.

19. The method of claim 1, wherein in step C polymerization of the photocurable composition occurs through a single reaction mechanism.

20. The method of claim 1, wherein the solid functionalized component has at least one functional group selected from (meth)acrylates, α-olefins, N-vinyls, vinylamides, cyanoacrylates, (meth)acrylamides, acryloyls, styrenics, epoxides, thiols, 1,3-dienes, vinyl halides, acrylonitriles, vinyl esters, maleimides, nadimides, itaconimides, vinyl ethers, vinyl carbonates, and vinyl carbamates.

21. The method of claim 1, wherein the solid functionalized component has a molecular weight of greater than about 400 daltons.

22. The method of claim 1, wherein the solid functionalized component has a molecular weight of greater than about 800 daltons.

23. The method of claim 1, wherein the solid functionalized component has a molecular weight of greater than about 1200 daltons.

24. The method of claim 1, wherein the solid functionalized component comprises a crystalline structure at or above a temperature of about 25° C.

25. The method of claim 1, wherein in step A the photocurable composition comprises a solid functionalized component having a backbone selected from sulfones, styrenes, isocyanurates, cyanate esters, maleimides, nadimides, itaconamides, adamantyl, biphenyls, novolak, norbornyls, triazines, carbonates, amides, urethanes, ureas, polyesters and combinations thereof.

26. The method of claim 1, wherein in step A the photocurable composition comprises a photoinitiator.

27. The method of claim 1, wherein the solid functionalized component has no added thermal initiator.

28. The method of claim 1, wherein in step C in addition to exposure to radiation in the electromagnetic spectrum, the photocurable composition is exposed to a temperature condition greater than the elevated temperature conditions used in step B to render the photocurable composition flowable.

29. The method of claim 1, further comprising step D:
   D. Contacting the three-dimensional part with a solvent or a wash liquid.

30. The method of claim 1, further comprising step E:
   E. Exposing the three-dimensional part formed in step C to an elevated temperature condition that is greater than the temperature condition to which the photocurable composition is exposed in step C.

31. The method of claim 29, further comprising step E:
   E. Exposing the three-dimensional part formed in step C to an elevated temperature condition that is greater than the temperature condition to which the photocurable composition is exposed in step C.

32. The method of claim 30, wherein in step E the elevated temperature condition is a temperature condition greater than the elevated temperature condition to which the photocurable composition is exposed in step B.

33. The method of claim 30, wherein in step E the elevated temperature condition is achieved by ramping at a pre-determined rate from the temperature condition of step B to at least one higher temperature condition.

34. The method of claim 30, wherein in step E the elevated temperature condition is at least 160° C.

35. The method of claim 30, wherein in step E polymerization of the photocurable composition occurs through a single reaction mechanism.

36. The method of claim 1, further comprising step F:

F. Exposing the three-dimensional part formed in step C to radiation in the electromagnetic spectrum of a wavelength different from the radiation in the electromagnetic spectrum used in step C.

37. The method of claim 36, wherein in step F the three-dimensional part is exposed to radiation in the electromagnetic spectrum emitted from a light source selected from an LED light source or a broad-band light source.

38. The method of claim 36, wherein in step F the three-dimensional part is exposed to a second form of radiation in the electromagnetic spectrum.

39. The method of claim 36, wherein in step F the three-dimensional part is exposed to a second form of radiation in the electromagnetic spectrum selected from gamma irradiation, electron beam or microwave irradiation.

40. The method of claim 1, wherein the photocurable composition is provided as chips, pellets, powder, wire, spooled or some other granule solid form factor.

41. The method of claim 1, wherein the photocurable composition is exposed to an elevated temperature of between about 45° C. to about 160° C. in a hopper system to render it into a flowable state.

42. The method of claim 1, wherein the photocurable composition is exposed to an elevated temperature in a continuous manner, through a nozzle, heated core, hot end, heated extruder or similar device.

43. The method of claim 1 wherein the photocurable composition is provided in a physical form factor with a surface area to volume ratio greater than 0.5:1.

44. A method for performing additive manufacturing using a photocurable composition to form a three-dimensional part, said three-dimensional part made according to data indicating a pre-determined pattern, comprising the steps of:

A. Providing a photocurable composition in a non-flowable state to a reservoir;

B. Subjecting the photocurable composition to conditions favorable to render the photocurable composition in a flowable state; and C. Exposing the flowable photocurable composition to radiation in the electromagnetic spectrum appropriate to initiate polymerization thereof as the three-dimensional printed part is made according to data indicating a pre-determined pattern, wherein in step B and/or step C the photocurable composition has a vapor pressure less than about 1 mm Hg, wherein in step B the photocurable composition is exposed to a temperature of between about 45° C. to about 160° C. and in step C the photocurable composition is exposed to a temperature of between about 45° C. to about 160° C.

45. A method for performing additive manufacturing using a photocurable composition to form a three-dimensional part, said three-dimensional part made according to data indicating a pre-determined pattern, comprising the steps of:

A. Providing a photocurable composition in a non-flowable state to a reservoir;

B. Subjecting the photocurable composition to conditions favorable to render the photocurable composition in a flowable state; and C. Exposing the flowable photocurable composition to radiation in the electromagnetic spectrum appropriate to initiate polymerization thereof as the three-dimensional printed part is made according to data indicating a pre-determined pattern, wherein in step A the photocurable composition comprising a solid functionalized component demonstrates a phase change from solid to liquid within a 5° C. increase in temperature measured by DSC over a period of time of 20 minutes.

46. A method for performing additive manufacturing using a photocurable composition to form a three-dimensional part, said three-dimensional part made according to data indicating a pre-determined pattern, comprising the steps of:

A. Providing a photocurable composition in a non-flowable state to a reservoir;

B. Subjecting the photocurable composition to conditions favorable to render the photocurable composition in a flowable state; and C. Exposing the flowable photocurable composition to radiation in the electromagnetic spectrum appropriate to initiate polymerization thereof as the three-dimensional printed part is made according to data indicating a pre-determined pattern, wherein the three-dimensional part formed in step C has a heat deflection temperature (@0.455 MPa) at least as high as the elevated temperature of step B and/or step C, wherein in step B the photocurable composition is exposed to a temperature of between about 45° C. to about 160° C. and in step C the photocurable composition is exposed to a temperature of between about 45° C. to about 160° C.

47. A method for performing additive manufacturing using a photocurable composition to form a three-dimensional part, said three-dimensional part made according to data indicating a pre-determined pattern, comprising the steps of:

A. Providing a photocurable composition in a non-flowable state to a reservoir;

B. Subjecting the photocurable composition to conditions favorable to render the photocurable composition in a flowable state; and C. Exposing the flowable photocurable composition to radiation in the electromagnetic spectrum appropriate to initiate polymerization thereof as the three-dimensional printed part is made according to data indicating a pre-determined pattern, wherein the three-dimensional part formed after step C achieves at least about 50% of at least one of its ultimate strength, its ultimate stiffness and its ultimate heat deflection temperature, wherein in step B the photocurable composition is exposed to a temperature of between about 45° C. to about 160° C. and in step C the photocurable composition is exposed to a temperature of between about 45° C. to about 160° C.

48. The method of claim 47, wherein the three-dimensional part formed after step E achieves about 100% of at least one of its ultimate strength, its ultimate stiffness and its ultimate heat deflection temperature.

49. The method of claim 48, wherein the three-dimensional part formed after step E demonstrates substantially homogeneous strength, stiffness and heat deflection temperature throughout its volume, regardless of size, geometry, internal complexity or surfaces irrespective of where the measurement is taken on the part.

50. The method of claim 48, wherein the three-dimensional part formed after step E demonstrates a tensile elongation>=yield strength of the three-dimensional part.

51. The method of claim 48, wherein the three-dimensional part formed after step E demonstrates a tensile elongation of at least about 6%.

52. The method of claim 48, wherein the three-dimensional part formed after step E demonstrates a tensile elongation of at least about 10%.

53. The method of claim 48, wherein the three-dimensional part formed after step E demonstrates a heat deflection temperature (@ 0.455 MPa) of greater than 100° C.

54. The method of claim 48, wherein the three-dimensional part formed after step E demonstrates a heat deflection temperature (@ 0.455 MPa) of greater than 120° C.

55. The method of claim 48, wherein the three-dimensional part formed after step E demonstrates a heat deflection temperature (@ 0.455 MPa) of greater than 160° C.

56. A method for performing additive manufacturing using a photocurable composition to form a three-dimensional part having superior physical properties, said three-dimensional part made according to data indicating a pre-determined pattern, comprising the steps of:

A. Providing a photocurable composition in a non-flowable state to a reservoir;

B. Subjecting the photocurable composition to a temperature condition favorable to render the photocurable composition in a flowable state, wherein the temperature condition is between about 45° C. and about 160° C.;

C. Exposing the flowable photocurable composition to radiation in the electromagnetic spectrum appropriate to initiate polymerization thereof as the three-dimensional printed part is made according to data indicating a pre-determined pattern, wherein in step C the photocurable composition is exposed to a temperature of between about 45° C. and about 160° C.; and D. Exposing the three-dimensional part formed in step C to an elevated temperature condition that is greater than the temperature condition to which the photocurable composition is exposed in step B and/or step C.

* * * * *